United States Patent
Jastrzebski et al.

[11] Patent Number: 6,078,859
[45] Date of Patent: Jun. 20, 2000

[54] SYSTEM AND METHOD FOR TORQUE BASED VEHICLE SPEED CONTROL

[75] Inventors: Marek Jareslaw Jastrzebski, South Lyon; Michael John Cullen; Eric Blaine Ferch, both of Northville; Stephen Alan De La Salle, Saline, all of Mich.

[73] Assignee: Ford Global Technologies, Inc., Dearborn, Mich.

[21] Appl. No.: 08/905,664

[22] Filed: Aug. 4, 1997

[51] Int. Cl.[7] .................. B60T 8/32; G05D 1/00; G06F 17/00

[52] U.S. Cl. .................. 701/93; 701/79; 701/101; 123/352; 180/170

[58] Field of Search .................. 701/74, 79, 83, 701/84, 85, 87, 93, 101; 123/352; 180/170

[56] References Cited

U.S. PATENT DOCUMENTS

| | | | |
|---|---|---|---|
| 3,648,798 | 3/1972 | Jania | 180/176 |
| 4,134,470 | 1/1979 | Riddel | 180/176 |
| 4,188,926 | 2/1980 | Fleischer | 123/352 |
| 4,478,183 | 10/1984 | Misch et al. | 123/339.21 |
| 5,241,855 | 9/1993 | Cullen et al. | 73/117.3 |
| 5,420,793 | 5/1995 | Oo et al. | 364/426.04 |
| 5,479,898 | 1/1996 | Cullen et al. | 123/350 |
| 5,493,302 | 2/1996 | Woll et al. | 342/71 |
| 5,495,251 | 2/1996 | Gilling et al. | 342/70 |
| 5,508,923 | 4/1996 | Ibamoto et al. | 701/70 |
| 5,553,589 | 9/1996 | Middleton et al. | 123/352 |
| 5,609,217 | 3/1997 | Honda et al. | 180/170 |
| 5,625,558 | 4/1997 | Togai et al. | 364/426.041 |
| 5,662,085 | 9/1997 | Aubourg et al. | 123/352 |
| 5,761,629 | 6/1998 | Gilling | 701/96 |
| 5,799,262 | 8/1998 | Suzuki | 701/93 |

*Primary Examiner*—William A. Cuchlinski, Jr.
*Assistant Examiner*—Gertrude Arthur
*Attorney, Agent, or Firm*—Mark S. Sparschu; Roger L. May

[57] ABSTRACT

A system and method for controlling vehicle speed include mutually exclusive closed loop controllers for vehicle speed and acceleration which control vehicle speed by requesting an appropriate wheel torque. The system and method compute, in real time, the wheel torque required to maintain steady vehicle speed or steady acceleration depending on the particular mode of operation. The active closed loop controller acts upon vehicle speed or acceleration errors to output a desired torque request.

13 Claims, 4 Drawing Sheets

SYSTEM AND METHOD FOR TORQUE BASED VEHICLE SPEED CONTROL

TECHNICAL FIELD

The present invention relates to a system and method for controlling speed of a vehicle using torque based speed control.

BACKGROUND ART

Vehicle speed control or cruise control systems are well known in the prior art. Typical systems and methods allow a vehicle operator to engage a cruise control device to set and maintain a constant vehicle speed and to subsequently resume a previously set vehicle speed after interruption. Mechanical, electromechanical, and electronic implementations have been developed for a wide variety of engine types. A number of control strategies utilize either PI or PID closed-loop control of the vehicle speed based upon throttle angle position.

The inventors herein have discovered that less complexity results by utilizing desired engine torque as an input rather than throttle angle position.

DISCLOSURE OF THE INVENTION

Thus, it is an object of the present invention to provide a system and method for vehicle speed control which utilize engine torque based controllers to improve linearity and stability. A further object of the present invention is to provide a system and method for torque-based vehicle speed control with greater calibration flexibility than the prior art systems and methods.

In carrying out the above objects and other objects, features and advantages of the present invention, a system for controlling speed of a vehicle having an internal combustion engine includes a sensor for determining current vehicle speed, at least one input device for indicating a desired vehicle speed, and a controller in communication with the sensor and the input device. The controller determines a speed error based on the current vehicle speed and the desired vehicle speed, determines a wheel torque to be delivered to wheels of the vehicle based on the speed error, and controls torque generated by the engine to reduce the speed error.

A method is also provided for controlling an internal combustion engine to control speed of a vehicle. The method includes determining an actual vehicle speed, a desired vehicle speed, and a speed error based on a difference between the actual speed and the desired speed, determining a desired wheel torque based on the speed error, and controlling torque generated by the engine to reduce the speed error to control the speed of the vehicle.

In one embodiment, the present invention includes separate mutually exclusive closed-loop controllers to improve calibration flexibility. A first controller maintains a desired vehicle speed by requesting a specific torque to be delivered to the wheels. When outside predetermined operating bounds, a second controller is activated to control vehicle acceleration to achieve a desired vehicle speed.

The advantages accruing to the present invention are numerous. For example, the output of an absolute desired wheel torque linearizes the dynamic response of the vehicle through piecewise linearization to maintain steady speed or steady acceleration. The utilization of separate speed and acceleration controllers allows calibration flexibility.

Various other advantages, objects, and features of the present invention will be readily apparent from the following detailed description of the invention when taken in connection with the accompanying drawings.

DETAILED DESCRIPTION OF THE INVENTION

Figure 1:
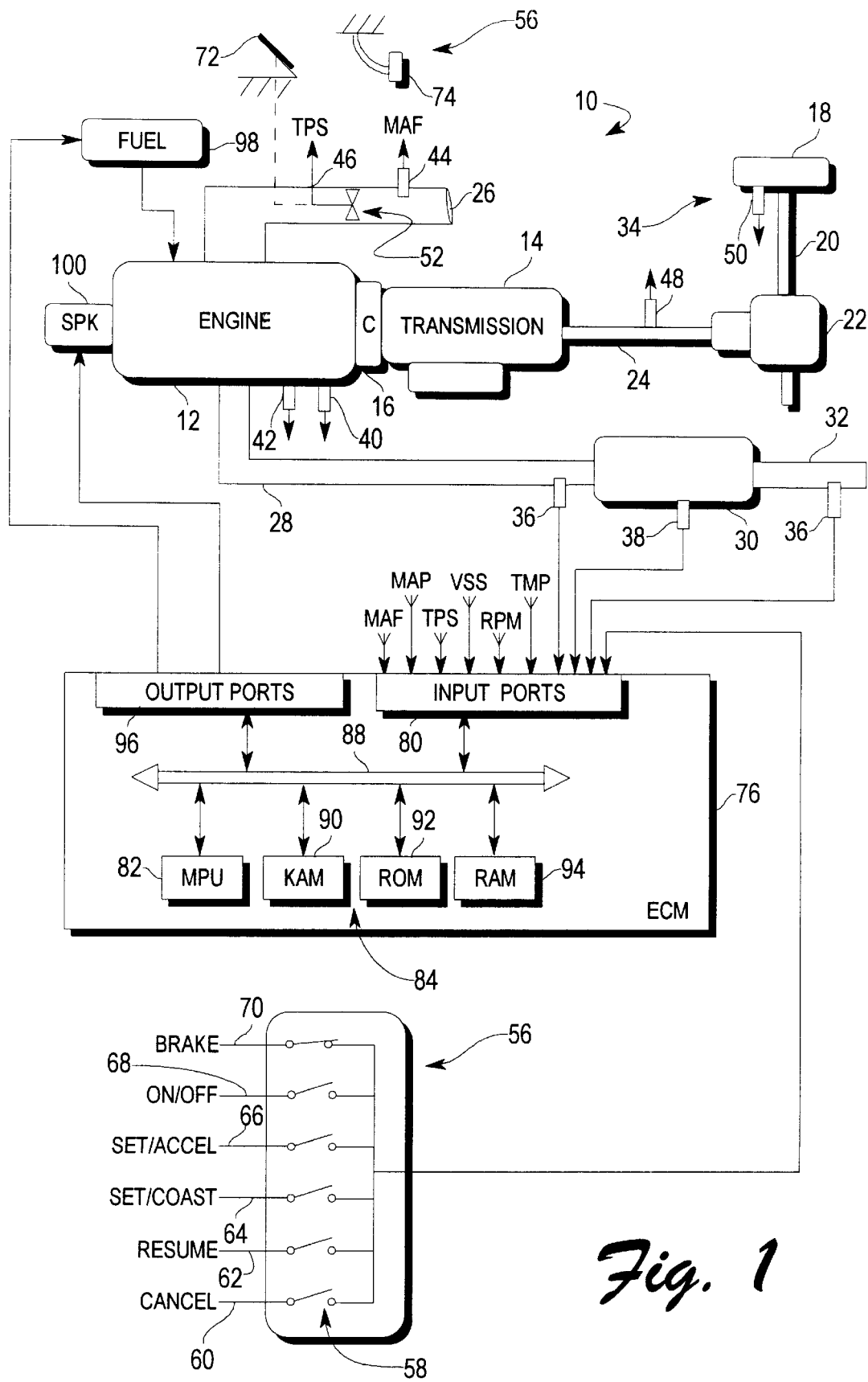
FIG. 1 is a block diagram illustrating a vehicle speed control system and method according to the present invention.

Referring now to FIG. 1, a block diagram illustrating a system and method for vehicle speed control according to the present invention is shown. System 10 includes an engine 12 connected to a transmission 14 via a clutch 16. Vehicle wheels 18 (only one of which is shown) are connected to transmission 14 via axle 20, transaxle 22, and prop shaft 24. While a rear-wheel drive system with a manual transmission is illustrated, the present invention may of course be applied to other vehicle configurations. In a preferred embodiment, engine 12 is a spark ignition (SI) engine which includes an intake 26 and an exhaust 28 connected to a catalytic converter 30 which is connect to an exhaust pipe 32. Various sensors, indicated generally by reference numeral 34, are used to monitor and control operation of engine 12 and/or transmission 14. Of course, the present invention may be applied to various other types of engines, such as compression-ignition or diesel engines. Sensors 34 may include any of a variety of well known sensors such as heated exhaust gas oxygen (HEGO) sensors 36, a catalytic converter temperature sensor 38, engine RPM sensor 40, coolant temperature sensor 42, mass air flow sensor 44, and throttle position sensor 46. Sensors 34 may also include a vehicle speed sensor 48 and one or more wheel speed sensors 50 to provide an indication of vehicle speed.

System 10 also includes various input devices, indicated generally by reference numeral 56, for indicating a desired vehicle speed. Input devices 56 may include switches 58 used to control a cruise control or vehicle speed controller. In a preferred embodiment, switches 58 include a first switch 60 which functions as a cancel switch, a second switch 62 which initiates a resume function, a third switch 64 which initiates a speed set/coast function, a fourth switch 66 which functions as a speed set/accelerate switch, a fifth switch 68 which functions as an on/off switch, and a brake switch 70 which functions similar to the cancel switch 60 to suspend operation of the cruise control function as explained in greater detail below. Input devices 56 also may include an accelerator pedal 72 and brake pedal 74. As illustrated, accelerator pedal 72 is associated with throttle position sensor 46. This may be a mechanical, electromechanical, or purely electrical/electronic connection. For example, in a "drive-by-wire" system, accelerator pedal 72 has an associated sensor which provides an input signal to an engine control module (ECM) 76 which in turn provides an output signal to an air flow actuator or throttling device, such as throttle valve 52 and associated position sensor 46. For systems without electronic throttle control, accelerator pedal 72 may be mechanically linked to throttle valve 52 to control the opening thereof. For mechanically linked systems, the vehicle cruise control may utilize a servo motor or similar device to control throttle valve 52 when the cruise control mode is activated.

As also illustrated in FIG. 1, system 10 preferably includes a controller, such as ECM 76, in communication with sensors 34 and input devices 56 via input ports 80. ECM 76 includes a microprocessor 82 in communication with various computer readable storage media 84 via a data and control bus 88. Computer-readable storage media 84 may include various types of volatile and non-volatile media or memories such as keep-alive memory 90, read-only memory 92, and random access memory 94. The various memories may be implemented utilizing any of a number of known hardware devices such as flash memory, PROMs, EEPROMs, and other electrical, electromagnetic, and optical storage devices capable of storing data representing instructions executable by a computer.

As is known, computer-readable media 84 contain various program instructions, software, or control logic to effect control of engine 12. Media 84 may include various types of data representing calibration values, current values of operating parameters, microprocessor instructions, and the like. Microprocessor 82 executes various instructions to generate output signals through output ports 96 based on signals received through input ports 80, generally indicative of current operating conditions. Output signals generated by ECM 76 are communicated to various system actuators such as fuel controller 98 and spark controller 100.

ECM 76 may generate various other output signals to control actuators or indicators depending on the particular application. For example, an output signal may be generated to control an air flow actuator, spark timing, and/or fuel quantity to control the torque generated by engine 12. In a preferred embodiment, ECM 76 communicates with input devices 56 and sensors 34 to determine a speed error based on the current vehicle speed and a desired vehicle speed. ECM 76 then determines an appropriate wheel torque to be delivered by engine 12 to wheels 18 of the vehicle based on the speed error and control the torque generated by engine 12 to reduce the speed error toward zero. Preferably, ECM 76 implements a PIQ (proportional-integral-quadratic) closed loop controller to maintain a desired vehicle speed or acceleration as explained below. PIQ control is explained in greater detail in U.S. Pat. No. 5,420,793 to Oo, et al. hereby incorporated by reference in its entirety. Engine torque may be determined as explained in detail in U.S. Pat. No. 5,241,855 to Cullen, et al. hereby incorporated by reference in its entirety. An appropriate wheel torque is then determined based on the tire size, transaxle ratio, and current transmission ratio. As is well known in the art, engine torque may be controlled by controlling air flow through intake 26 of engine 12, controlling fuel quantity through fuel controller 98, and/or controlling spark timing through spark controller 100. Preferably, engine torque is controlled by controlling airflow through intake 26 via a throttling device.

In one embodiment of the present invention, ECM 76 determines a current vehicle acceleration based on a change of the vehicle speed over a predetermined period or event. The vehicle speed may be determined using the vehicle speed sensor 48 and/or one or more wheel speed sensors 50. Alternatively, vehicle acceleration may be determined using an accelerometer or similar device. In this embodiment, ECM 76 determines an appropriate wheel torque to be delivered to wheels 18 based on the current vehicle acceleration and a desired vehicle acceleration. ECM 76 then controls the torque generated by engine 12 to reduce the acceleration error toward zero. Preferably, ECM 76 includes appropriate instructions or control logic implemented in software and hardware to realize both a closed loop PIQ vehicle speed controller and a closed loop PIQ vehicle acceleration controller, the operation of which are mutually exclusive as explained in greater detail below.

Figure 2:
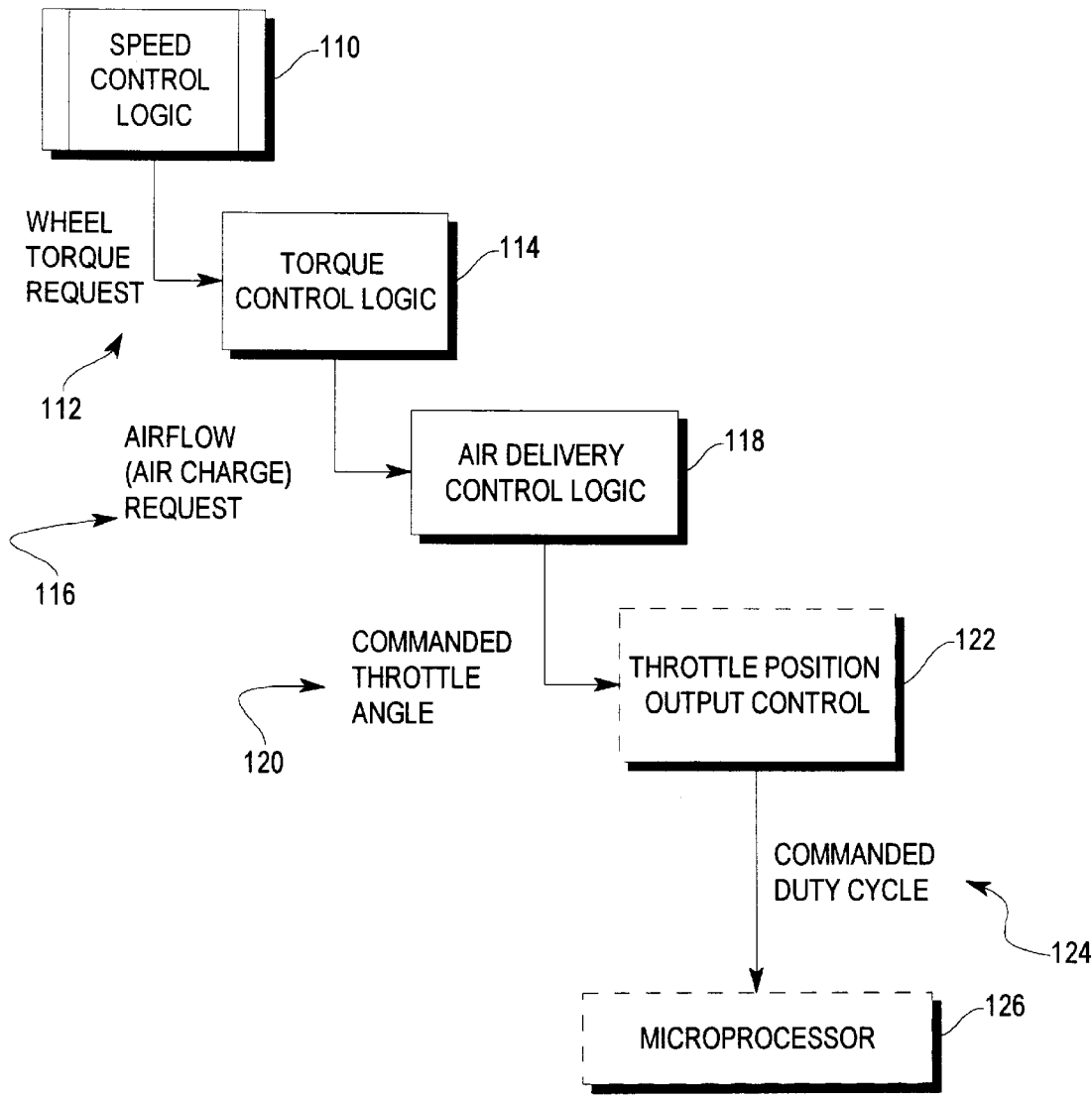
FIG. 2 is a block diagram illustrating organization of a torque-based control strategy according to the present invention.
Figure 3:
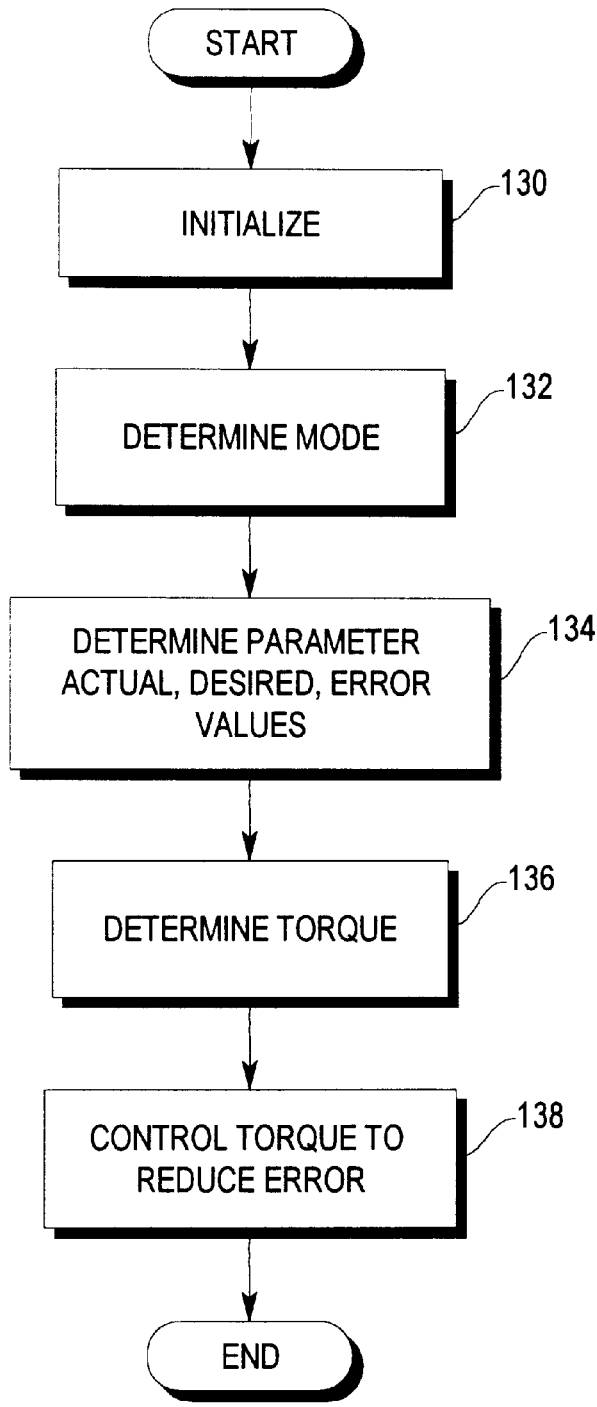
FIG. 3 is a flow chart illustrating control logic for implementing a system and method for vehicle speed control according to the present invention.
Figure 4:
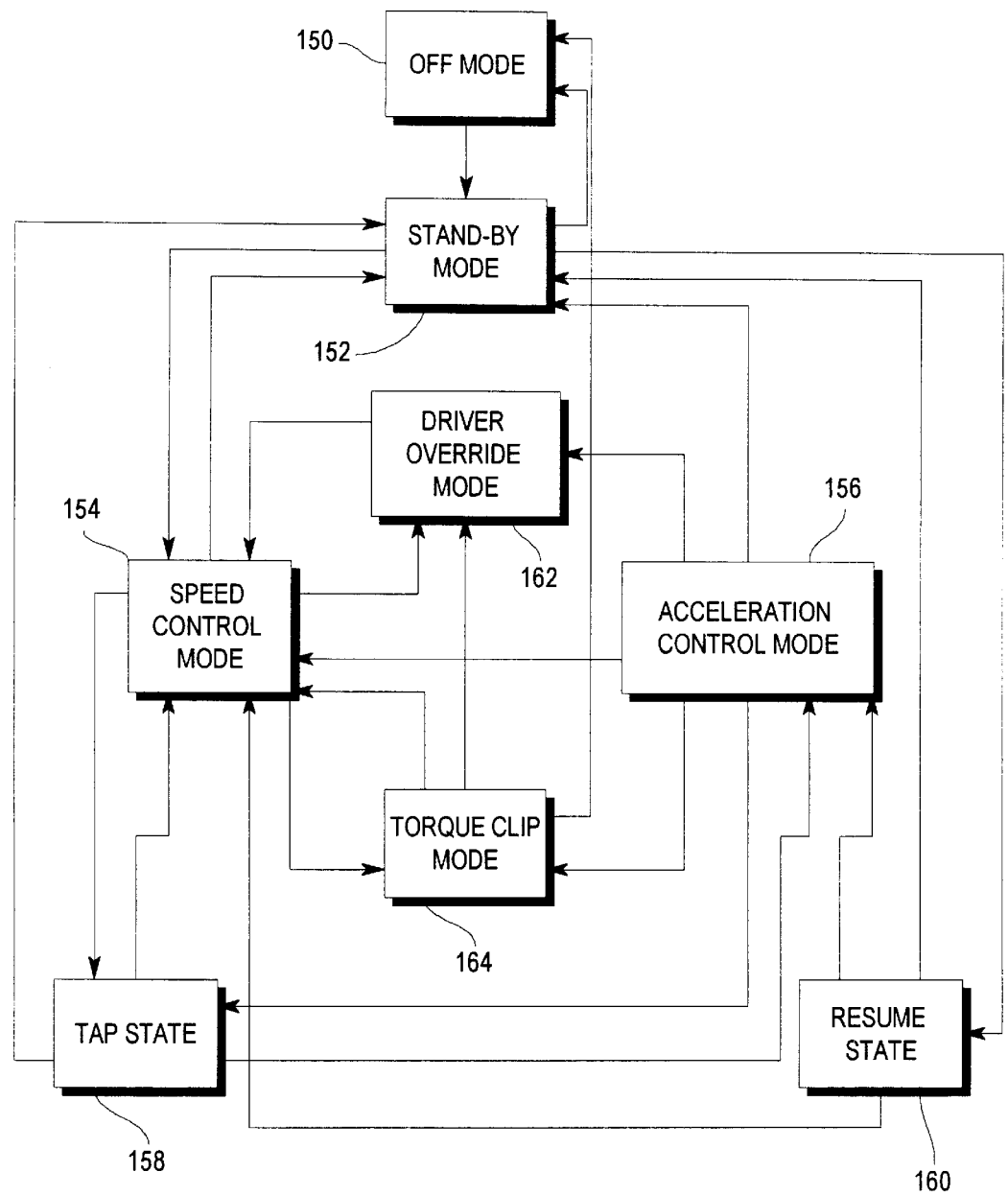
FIG. 4 is a state transition diagram of one embodiment of the present invention.

Referring now to FIG. 2, a block diagram illustrating various components or modules of the control logic, along with associated outputs, is shown. As one of ordinary skill in the art will appreciate, the various functions or operations shown in FIGS. 2–4 may be performed by software, hardware, or a combination of hardware and software. Furthermore, the particular order of operations and functions illustrated may not be necessary to accomplish the objects and advantages according to the present invention. In general, sequential operation is shown for ease of illustration only. As such, various processes and strategies may be used depending upon the particular application, including multitasking, interrupt (time) driven, event driven, or parallel computing strategies may be used to implement the illustrated control logic. Similarly, one of ordinary skill will in the art may recognize various equivalent implementations in hardware and/or software to accomplish the objects and advantages of the present invention. In a preferred embodiment of the present invention, the functions illustrated in FIGS. 2–4 are implemented primarily as software within a controller such as ECM 76.

Block 110 of FIG. 2 represents the speed (or acceleration) control logic which maintains a steady vehicle speed or acceleration. The primary inputs for this feature include the vehicle speed, vehicle acceleration, and the status of the command switches for the cruise control. The primary output of block 110 is an absolute wheel torque request (as opposed to a limit or maximum torque request), indicated generally by reference numeral 112. The value of the wheel torque request parameter represents the torque computed by the active controller which must be delivered to the driven wheel of the vehicle to maintain or resume the desired vehicle speed.

Block 114 of FIG. 2 represents the torque control logic which determines an appropriate value for the engine parameter being used to control the torque of the engine. Preferably, torque control logic 114 generates an output in the form of an air flow or air charge request, represented generally by reference numeral 116. Required air flow is calculated as follows. Required brake engine torque is calculated from required wheel torque, axle ratio, gear ratio, torque converter speed ratio (if unlocked), and an estimate of the mechanical efficiency. Required indicated engine torque is calculated from brake engine torque plus friction torque where friction torque is calculated as described in U.S. Pat. No. 5,241,855. This indicated torque is adjusted for spark retard from MBT and air/fuel deviations from stoichiometric to standardize the value before table look-up. The standardized indicated torque is entered into a table with engine speed to determine required air mass flow. Of course, one of ordinary skill will recognize various other ways to control the torque of the engine, such as by controlling fuel, spark advance, or the like.

Air delivery control logic, represented by block 118, converts the air flow request 116 to a commanded throttle angle. As will be appreciated by one of ordinary skill in the art, speed control logic 118, torque control logic 114, and air delivery control logic 118 may use one or more look-up tables or equivalent equations which include various calibrations depending on the particular application. The look-up tables and/or equations are used to determine an appropriate output based on one or more inputs. As such, air delivery control logic 118 determines an appropriate commanded throttle angle, represented generally by reference numeral 120. In a preferred embodiment, the required throttle angle is calculated by first standardizing the air mass based on barometric pressure and inlet air temperature (corrected to sea level). The standardized air mass value is then used, along with the pressure ratio across the throttle, to reference a look-up table which determines a required throttle angle or equivalent accelerator pedal position. For vehicles utilizing electronic throttle control systems, the commanded throttle angle is realized by an electric air flow actuator which receives an appropriate signal generated by air delivery control logic 118.

Blocks 122–126 of FIG. 2 apply only to vehicles which do not utilize electronic throttle control. In these vehicles, the commanded throttle angle is provided to throttle position output control 122 which generates an appropriate commanded duty cycle 124 for microprocessor 126.

Referring now to FIG. 3, a flow chart illustrating a system and method for controlling speed of a vehicle according to the present invention is shown. The flow chart of FIG. 3 is a simplified representation of one embodiment of the invention of which a more detailed representation is illustrated for the embodiment of FIG. 4. Block 130 of FIG. 3 represents a variety of conditional checks which are performed during initialization of the system. These preferably include both internal checks within the software, and external monitoring of various other powertrain components or features. If one or more conditions are not satisfied, the cruise control may be disabled and an appropriate indicator illuminated, such as the check engine light, or the like.

Provided the necessary conditions are satisfied by the initialization represented by block 130, the current operating mode or state is determined as represented by block 132. Only one state or mode may be active or in control at any time and as such, the states are mutually exclusive. The current operating mode or state is generally determined by the previous operating state and the status of the input devices, such as the cruise control switches and accelerator pedal. Preferably, two separate PIQ closed loop controllers are utilized to provide calibration flexibility in tuning the system for optimal performance under various road and engine operating conditions. In such an embodiment, the first controller operates as a vehicle speed (VS) controller while the second controller operates as an acceleration controller. When the vehicle cruise control is active, block 132 determines or selects either the speed control mode or the acceleration control mode, preferably based on user input although other factors may be considered as described with reference to FIG. 4. The acceleration control mode is preferably activated when a continuous acceleration or deceleration request is received. Such a request may be indicated by pressing the set/accel switch 66 or set/coast switch 64 for a calibratable predetermined period of time, such as 640 ms.

A current actual (measured) value is determined for the appropriate control parameter (speed or acceleration) as represented by block 134. The current value is compared to a previously set or desired value to determine an error value. The error value is used to determine a desired wheel torque based on the speed error as indicated by block 136. Block 138 represents the step of controlling the engine torque generated by the engine based on the selected control mode to reduce the speed error or acceleration error toward zero. Preferably, the engine torque is controlled primarily by controlling airflow to the engine. In one embodiment, airflow is controlled by controlling position of the throttle pedal.

Referring now to FIG. 4, a state transition diagram for one embodiment of the present invention is shown. As should be appreciated by one of ordinary skill in the art, the number of states, the names of states, and allowed transitions between various states depend upon the particular application and may be implemented in a variety of equivalent manners. As such, the state transition diagram of FIG. 4 provides only one example used to describe the present invention. Preferably, execution of various system operating modes is facilitated through a state machine having states similar to those represented by blocks 150–164. The states or modes include an OFF mode 150, standby mode 152, speed control mode 154, acceleration control mode 156, tap mode 158, resume mode 160, driver override mode 162, and torque clip mode 164. By definition, the state machine represented by the modes in FIG. 4 may exist in only one state (mode) at any time. Arrows indicate allowable state transitions which occur when applicable parameters are satisfied. As will be appreciated by one of ordinary skill in the art, a state transition may result in modification of various status/control variables or parameters which are used to represent the state machine.

Before any mode other than OFF mode 150 may be executed, the system preferably performs a variety of conditional checks which include both internal and external checks to monitor other system components or software features. When the system is not in an active control mode, i.e. speed control mode 154 or acceleration control mode 156, the state machine can be either in OFF mode 150 or standby mode 152. In the OFF mode 160, all the global output registers are reset to default values. In the standby mode 152, the logic executes an open loop torque prediction or pre-positioning to anticipate an engagement command from the driver. During that time, the actual (calculated or inferred) wheel torque output is written into a speed control output register of the speed controller. In a preferred embodiment, the actual torque is determined as a function of a speed/load table, air/fuel ratio, and spark advance as explained in detail in U.S. Pat. No. 5,241,855.

During normal vehicle operation, when the driver sets the desired speed for the first time, the state machine will enter the speed control mode 154 which will be maintained unless a continuous acceleration or deceleration command is issued by the driver. A continuous acceleration command may be indicated, for example, by depressing the set/accel switch for a predetermined calibratable period of time, such as 640 milliseconds. Similarly, a continuous deceleration command may be indicated by depressing the set/decel switch for some time period. It should be noted that acceleration control mode 156 may control either positive or negative acceleration, i.e. deceleration. Acceleration control mode 156 may also be activated when the driver depresses the resume switch. Once the speed error or acceleration error falls below a corresponding threshold, the vehicle speed control mode is activated to maintain the desired or set speed.

Tap mode 158 is entered when either the set/accel switch or the set/coast switch is momentarily depressed. When a sequence of "tap" commands are received, such as by repeatedly pressing and releasing either the set/accel switch or the set/coast switch, the state machine may execute either the vehicle control mode 154 or the acceleration control mode 156 depending on the new value of the set speed and the calibration of the operating bounds. Similarly, when in standby mode 152 and the resume switch is activated so that the state machine enters resume mode 160, either speed control mode 154 or acceleration control mode 156 may become active. When the system is not in either active control mode, i.e. speed control mode 154 or acceleration control mode 156, the system will be in either off mode 150 or standby mode 152.

A driver override mode 162 is activated when torque requested by the driver through the accelerator pedal exceeds torque requested by either the speed control mode 154 or acceleration control mode 156. The driver override mode activates a pre-position torque request and suspends the integrator of the active PIQ control loop to prevent integrator wind-up. The system operates in what may be described as a P-Q mode while in driver override mode 162. A transition to speed control mode 154 occurs when the torque requested by the driver via the accelerator pedal falls below the torque requested by speed control mode 154 provided the vehicle speed is above a predetermined reset speed and no "tap" command is received. A torque clip mode may also be provided to limit the maximum or minimum torque level to prevent component damage or engine stalling, respectively. As illustrated, the torque clip mode 164 may transition to either speed control mode 154, driver override mode 1, or OFF mode 150.

While the best mode for carrying out the invention has been described in detail, those familiar with the art to which this invention relates will recognize various alternative designs and embodiments for practicing the invention as defined by the following claims.

What is claimed is:

1. A cruise control system for a motor vehicle including an internal combustion engine, the system comprising:
   a sensor for determining current vehicle speed;
   at least one input device for indicating a desired vehicle speed; and
   a controller in communication with the sensor and the input device, the controller determining a speed error based on the current vehicle speed and the desired vehicle speed, detecting a desired vehicle acceleration based on the speed error, determining an acceleration error based on the desired acceleration and current acceleration, determining wheel torque to be delivered to wheels of the vehicle based on one of the speed error and the acceleration error, and controlling torque generated by the engine to reduce one of the speed error and the acceleration error.

2. The system of claim 1 wherein the controller controls torque generated by the engine by controlling airflow to the engine.

3. The system of claim 1 wherein the controller selects one of a vehicle speed control mode and an acceleration control mode based on the speed error and controls the engine based on the selected control mode.

4. The system of claim 3 wherein the controller selects the vehicle speed control mode when the speed error is within predetermined limits.

5. A cruise control system for a motor vehicle including an internal combustion engine, the system comprising:
   a sensor for determining current vehicle speed;
   at least one input device for indicating a desired vehicle speed; and
   a controller in communication with the sensor and the input device, the controller determining a speed error based on the current vehicle speed and the desired vehicle speed, detecting a desired vehicle acceleration based on the speed error, determining an acceleration error based on the desired acceleration and current acceleration, determining wheel torque to be delivered to wheels of the vehicle based on one of the speed error and the acceleration error, and controlling torque generated by the engine to reduce one of the speed error and the acceleration error, wherein the controller required torque to maintain the desired vehicle speed to anticipate receiving a cruise control engagement signal.

6. The system of claim 5 wherein the controller uses the predicted wheel torque value upon receiving a cruise control engagement signal.

7. A method for controlling an internal combustion engine to control speed of a vehicle, the method comprising:
   determining an actual vehicle speed, a desired vehicle speed, and a speed error based on a difference between the actual speed and the desired speed;
   determining vehicle acceleration,
   selecting one of a speed control mode and an acceleration control mode based on the speed error; and
   controlling the torque generated by the engine based on the selected control mode to reduce the speed error or an acceleration error, respectively, the acceleration error based on a difference between the vehicle acceleration and a desired acceleration, the desired acceleration determined based on magnitude of the speed error.

8. The method of claim 7 wherein controlling torque generated by the engine comprises controlling airflow to the engine.

9. The method of claim 7 wherein the vehicle includes a throttle pedal for controlling airflow to the engine and wherein controlling torque generated by the engine comprises controlling airflow to the engine by controlling position of the throttle pedal.

10. A method for controlling an internal combustion engine to control speed of a vehicle, the method comprising:
    determining an actual vehicle speed, a desired vehicle speed, and a speed error based on a difference between the actual speed and the desired speed;
    determining a desired wheel torque based on the speed error;
    calculating required wheel torque to maintain the actual vehicle speed while operating in a standby mode in anticipation of receiving a speed control engagement signal; and
    using the calculated wheel torque to control torque generated by the engine after receiving the speed control engagement signal.

11. A computer readable storage medium having stored therein instructions executable by a computer to control an internal combustion engine to effect torque based speed control, the medium comprising:
    instructions for determining a desired vehicle speed, and a speed error based on a difference between an actual vehicle speed and the desired speed;
    instructions for determining a desired wheel torque based on the speed error;

instructions for determining vehicle acceleration;

instructions for selecting one of a speed control mode and an acceleration control mode based on the speed error; and instructions for controlling the torque generated by the engine based on the selected control mode to reduce the speed error or an acceleration error, respectively, the acceleration error based on a difference between the vehicle acceleration and a desired acceleration, the desired acceleration determined based on magnitude of the speed error.

12. The storage medium of claim 11 wherein the instructions for controlling torque generated by the engine comprise instructions for controlling airflow to the engine.

13. The storage medium of claim 11 further comprising instructions for calculating required wheel torque to maintain the current vehicle speed while operating in a standby mode in anticipation of receiving a speed control engagement signal; and instructions which use the calculated wheel torque to control torque generated by the engine after receiving the speed control engagement signal.

\* \* \* \* \*